United States Patent [19]
Thalheimer et al.

[11] Patent Number: 5,996,016
[45] Date of Patent: Nov. 30, 1999

[54] REINITIATION OF BIND CALLS FOR IP APPLICATIONS CONCURRENTLY EXECUTING WITH ALTERNATE ADDRESS

[75] Inventors: Dana R. Thalheimer, Raleigh; Alvah Dean Fuqua, Wake Forest; Hwaan A. Lee, Raleigh, all of N.C.

[73] Assignee: International Business Machines Corporation, Armonk, N.Y.

[21] Appl. No.: 08/834,250

[22] Filed: Apr. 15, 1997

[51] Int. Cl.$^6$ .............................. H04J 3/16; H04J 15/00; G06F 3/00
[52] U.S. Cl. .......................... 709/227; 709/228; 709/230; 709/249; 709/203; 709/218
[58] Field of Search ..................... 395/200.48, 200.33, 395/200.57, 200.58, 200.6, 200.79; 709/203, 218, 227, 228, 230, 249

[56] References Cited

U.S. PATENT DOCUMENTS

| | | | |
|---|---|---|---|
| 5,568,487 | 10/1996 | Sitbon et al. | 395/200.6 |
| 5,721,876 | 2/1998 | Yu et al. | 395/200.79 |
| 5,732,213 | 3/1998 | Gessel et al. | 395/200.57 |
| 5,740,375 | 4/1998 | Dunne et al. | 395/200.48 |
| 5,754,774 | 5/1998 | Bittinger et al. | 395/200.33 |
| 5,764,915 | 6/1998 | Heimsoth et al. | 395/200.57 |
| 5,802,306 | 9/1998 | Hunt | 395/200.58 |
| 5,809,235 | 9/1998 | Sharma et al. | 395/200.54 |

OTHER PUBLICATIONS

*STARDUST® WinSock Component Architecture, WinSock 2 Developer Training*, Stardust™ Technologies, Inc.

*Primary Examiner*—Zarni Maung
*Assistant Examiner*—William D. Thomson
*Attorney, Agent, or Firm*—Myers, Bigel, Sibley & Sajovec; Jeanine S. Ray-Yarletts

[57] ABSTRACT

Methods, systems and computer program products are provided which provide a plurality of IP applications in a single processing system by intercepting a bind call of an IP application. An alternate address is obtained for utilization with the IP application and the bind call reinitiated utilizing the alternate address. Furthermore, it may be determined if an alternate address is to be utilized with the IP application the alternate address obtained if it is determined that an alternate address is to be used. Then, the bind call is reinitiated utilizing the alternate address if it is determined that an alternate address is to be utilized with the IP application. The bind call may also be reinitiated utilizing an address of the intercepted bind call if it is determined that an alternate is not to be utilized.

17 Claims, 4 Drawing Sheets

REINITIATION OF BIND CALLS FOR IP APPLICATIONS CONCURRENTLY EXECUTING WITH ALTERNATE ADDRESS

FIELD OF THE INVENTION

The present invention relates to computer networks and more particularly to networks using the Internet Protocol.

BACKGROUND OF THE INVENTION

As the popularity of the Internet has grown so has the number of networks utilizing the Transmission Control Protocol/Internet Protocol (TCP/IP) for inter-processor communications. In fact, the popularity of TCP/IP has led to many internal networks (or intra-nets) being based upon this industry standard. TCP/IP utilizes an IP address as a means to route messages between networked computers and networks of networked computers.

In a typical network utilizing TCP/IP each workstation or computer uses a network interface to communicate with other workstations in the network and with other networks. When a TCP/IP application, such as a web browser or network management software using the Simple Network Management Protocol (SNMP), is initialized in a PC platform computer it utilizes a software component known as a TCP/IP stack as part of the connection between the application and the network interface. In other platforms other components allow for connection to TCP/IP networks. For example, software called MacTCP allows a Macintosh to utilize TCP/IP and TCP/IP is built into most UNIX systems. In any case, one function of this TCP/IP software is to associate an IP address with an application. In a TCP/IP stack this association is typically made during a bind operation where the address of the network interface is bound to the application. Thus, for example, multiple instances of a web browser would all be bound to the same IP address in a computer with a single network interface card.

Some implementations of TCP/IP also include a feature known as address aliasing. In address aliasing two or more IP addresses are associated with a single network interface. However, no provision is made in most applications for binding to specific IP addresses. Thus, there is no mechanism for changing the IP address to which the application is bound. To provide multiple instances of the same application bound to different IP addresses each application would need to be rewritten to utilize a specific IP address rather than the generic INET_ADDR_ANY parameter which specifies all of the IP addresses associated with a network interface.

One example of the difficulties presented by the one-to-one correspondence of IP addresses to network interfaces arises in network testing. In order to test a network for stress, capacity or performance or for regression testing of IP network software on a large network it has typically been necessary to use a large amount of hardware to replicate the network as each network interface could only support one IP address. Thus if five-hundred IP application instances were to be tested five-hundred network interfaces would be needed. This test solution often presented logistical problems in replicating a large network and control and traffic problems if an existing production network is used for testing. While network "simulation" software, such as for example, NetworkTools Virtual Agent™, has been available, this software typically did not allow for the use of off-the-shelf application software without modification to the application software.

In view of the above discussion, there exists a need for improvement in the association of IP addresses to network interface hardware. A further need exists in the ability to test networks without physically replicating the network under test.

SUMMARY OF THE INVENTION

In view of the above discussion, it is an object of the present invention to allow any TCP/IP application to bind to any IP address.

Another object of the present invention is to allow for multiple IP addresses with a single network interface without the need to rewrite application software.

A further object of the present invention is to allow for simulation of TCP/IP networks without the need to replicate the network hardware or rewrite application software.

These and other objects of the present invention are provided by methods, systems and computer program products which provide a plurality of IP applications in a single processing system by intercepting a bind call of an IP application. An alternate address is obtained for utilization with the IP application and the bind call reinitiated utilizing the alternate address. Furthermore, it may be determined if an alternate address is to be utilized with the IP application the alternate address obtained if it is determined that an alternate address is to be used. Then, the bind call is reinitiated utilizing the alternate address if it is determined that an alternate address is to be utilized with the IP application. The bind call may also be reinitiated utilizing an address of the intercepted bind call if it is determined that an alternate is not to be utilized.

In one embodiment of the present invention, the IP stack of the processing system is exited during a bind function. A TCP/IP aliased address to be bound to the application is then obtained and the IP stack returned to bind the obtained TCP/IP aliased address to the application. Alias IP addresses may be obtained by prompting a user to input an alias address.

By binding applications to unique address/port pairs a number of TCP/IP applications, such as SNMP network management applications, can be utilized on a single processing system. Thus, the need for dedicated hardware and a network interface for each IP application can be avoided through use of the present invention.

By using the address aliasing feature of many TCP/IP implementations, the present invention allows for any number of IP applications to be associated with a single network interface. Accordingly, entire networks may be simulated utilizing the TCP/IP address aliasing feature in conjunction with the present invention. Furthermore, these multiple devices in a single processing system may be utilized for performance testing, regression testing, network prototyping, software diagnostics or numerous other applications which require a number of TCP/IP devices. Thus, these traditionally hardware intensive applications may be carried out without requiring the traditional amount of hardware.

In another embodiment of the present invention a TCP/IP network may be simulated by initiating a plurality of TCP/IP application programs. The bind call of each of the TCP/IP application programs is intercepted and at least one unique alternate address to be utilized for each of the TCP/IP application programs is provided. The bind call is then reinitiated utilizing the alternate addresses for each of the plurality of TCP/IP applications so as to provide a plurality of TCP/IP applications bound to a network interface in a single processing system.

In a further embodiment the network interface of the single processing system may be connected to a TCP/IP network. Furthermore, at least one of the plurality of TCP/IP applications may comprise a network management application which may be utilized for monitoring network characteristics.

In one particular embodiment of the present invention, a TCP/IP alias address is established for each of the plurality of TCP/IP applications and these TCP/IP aliased addresses are utilized as the unique alternate addresses for the plurality of TCP/IP applications.

As will further be appreciated by those of skill in the art, the present invention may be embodied as a method, apparatus or computer program product.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As will be appreciated by one of skill in the art, the present invention may be embodied as methods or devices. Accordingly, the present invention may take the form of an entirely hardware embodiment, an entirely software embodiment or an embodiment combining software and hardware aspects.

Figure 1:
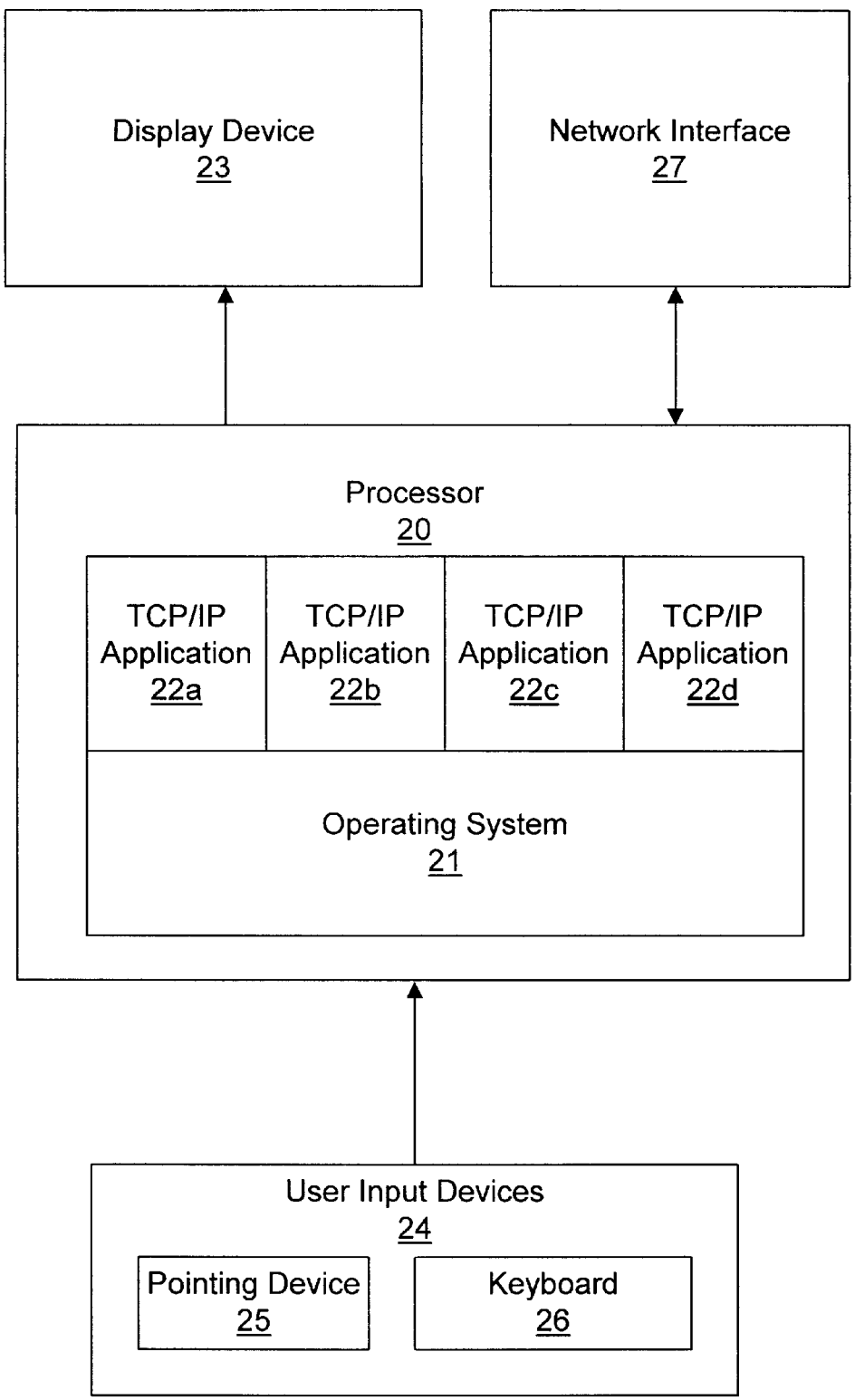
FIG. 1 is block diagram of a processing system suitable for use with the present invention.

FIG. 1 illustrates a data processing system on which multiple IP applications may be established according to the present invention. As seen in FIG. 1, a data processor 20 may have an operating system 21 resident in the processor 20. Multiple TCP/IP applications 22a through 22d may be executing on the operating system 21. The processor 20 displays information on a display device 23. For obtaining input from a user, the operating system 21 and/or the applications 22a through 22d may utilize user input devices 24. User input devices 24 may include a pointing device 25 and a keyboard 26 or other input devices known to those of skill in the art. A network interface 27 allows access to external networks.

While the present invention is illustrated herein with reference to four TCP/IP applications, as will be appreciated by those of skill in the art, any number of applications may be utilized. Furthermore, any type of TCP/IP application may be utilized including, for example, network management applications such as an SNMP application, File Transfer Protocol (FTP) applications, web browsers or any other type of TCP/IP applications.

The present invention will now be described with respect to FIG. 2 which is a flowchart illustrating the operation of a processing system, for example, as depicted in FIG. 1, utilizing the present invention. It will be understood that each block of the flowchart illustration, and combinations of blocks in the flowchart illustration, can be implemented by computer program instructions. These program instructions may be provided to a processor to produce a machine, such that the instructions which execute on the processor create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based systems which perform the specified functions or steps, or combinations of special purpose hardware and computer instructions.

Figure 2:
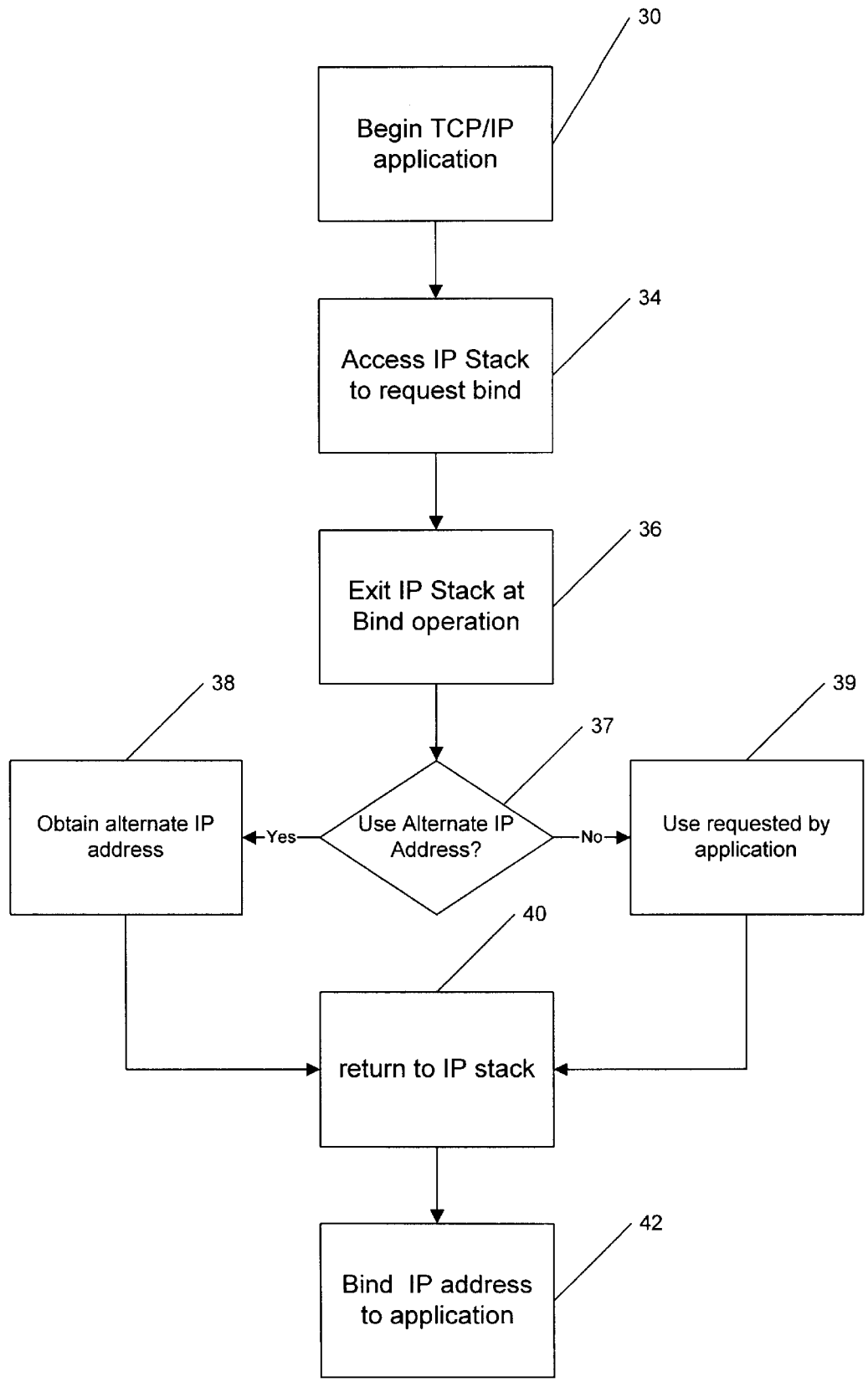
FIG. 2 is a flow chart illustrating the present invention.

As seen in block 30 of FIG. 2 an instance of a TCP/IP application, such as application 22a, is initiated by user input from keyboard 26 or other means on the processing system of FIG. 1 such as a PC platform personal computer. With the initiation of a TCP/IP application the IP stack of the processing system is accessed (block 34)to request a bind function be carried out for the TCP/IP application. The IP stack carries out the normal functions of an IP stack until the bind operation of the IP stack is reached. At this point, the IP stack is exited (block 36). It is then determined if an alternate IP address is to be used (block 37). As used herein, the term "alternate address" refers to any address other than the default IP address associated with the network interface. If an alternate address is to be used the alternate IP address of the TCP/IP application 22a is obtained (block 38). The alternate address may have been previously established for the application or it may be established after initiation of the application. Furthermore, the alternate address may be an aliased address associated with a network interface. In such a case multiple applications may be bound to IP addresses associated with a single network interface.

If an alternate address is not used, then the default address, which was originally passed to the bind function by the application, is utilized (block 39). After determining the address, the IP stack is returned to (block 40) and the determined IP address is then bound to the network interface (block 42). The process described in FIG. 2 may then be carried out for other TCP/IP applications such that multiple applications may be bound to their own IP addresses.

As will be appreciated by those of skill in the art, a "user exit" may be utilized to exit from the IP stack to obtained the new "bind to" address. Furthermore, because a user exit is utilized to obtain the alternate address, there is no need to modify application programs which bind to the network interface. Also, if no alternate address is determined the original passed address will be utilized for the bind and, thus, the bind would occur in the typical fashion. Therefore, the present invention may allow for the use of existing TCP/IP applications without modification of the application and with a single IP stack.

In one embodiment, an IP stack exit for use in carrying out the present invention is implemented as a dynamic link library (DLL). For example, the OS/2 DLL SO32DLL may be modified for use in the present invention. In such an embodiment the SO32DLL DLL is replaced with a modified DLL which exits the IP stack at the execution of a bind function. The exit turns control over from the IP stack to a DLL which obtains the address to be bound to which, as described above, may be an aliased address. Similarly, in an AIX environment, the AIX library libbsd.a may also be replaced with a similarly modified library to carry out the function of the present invention. As will be appreciated by those of skill in the art, the present invention may be utilized with any operating system or processing system platform which allows for modification of the function which binds the IP address of an application to a network interface.

Figure 3:
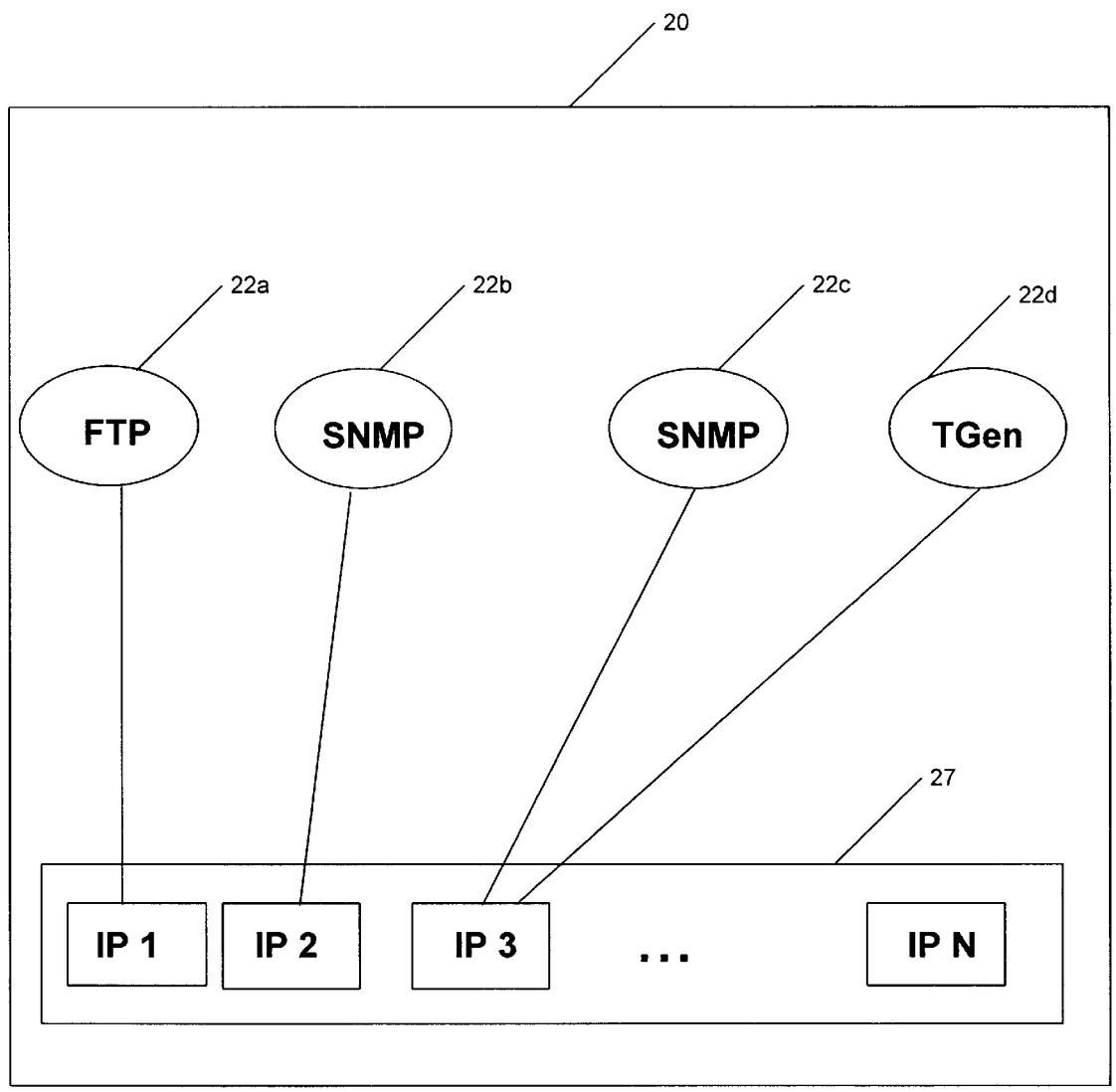
FIG. 3 is a block diagram illustrating the association of multiple IP addresses with a single network interface according to the present invention.

FIG. 3 is a block diagram illustrating multiple TCP/IP applications having multiple IP addresses in a single processing system 20. As seen in FIG. 3 a first TCP/IP application 22a, which is illustrated as an FTP application, is bound utilizing the process described above to a first IP address IP1 associated with network interface 27. Similarly, a second TCP/IP application 22b, which is illustrated as a SNMP application, is bound to a second IP address IP2 which is also associated with network interface 27. A third TCP/IP application 22c such as a second SNMP application, is bound to IP3 which is associated with network interface 27. Finally, a fourth TCP/IP application 22d may also be bound to IP address IP3 utilizing the above process. Any number of applications and/or addresses may be bound to network interface 27 on a one-to-one basis or with other relationships, such as is illustrated in FIG. 3. While the present invention is illustrated in FIG. 3 as utilizing four applications, as will be appreciated by those of skill in the art, any number of TCP/IP applications may be created on a single processing system utilizing the present invention.

Figure 4:
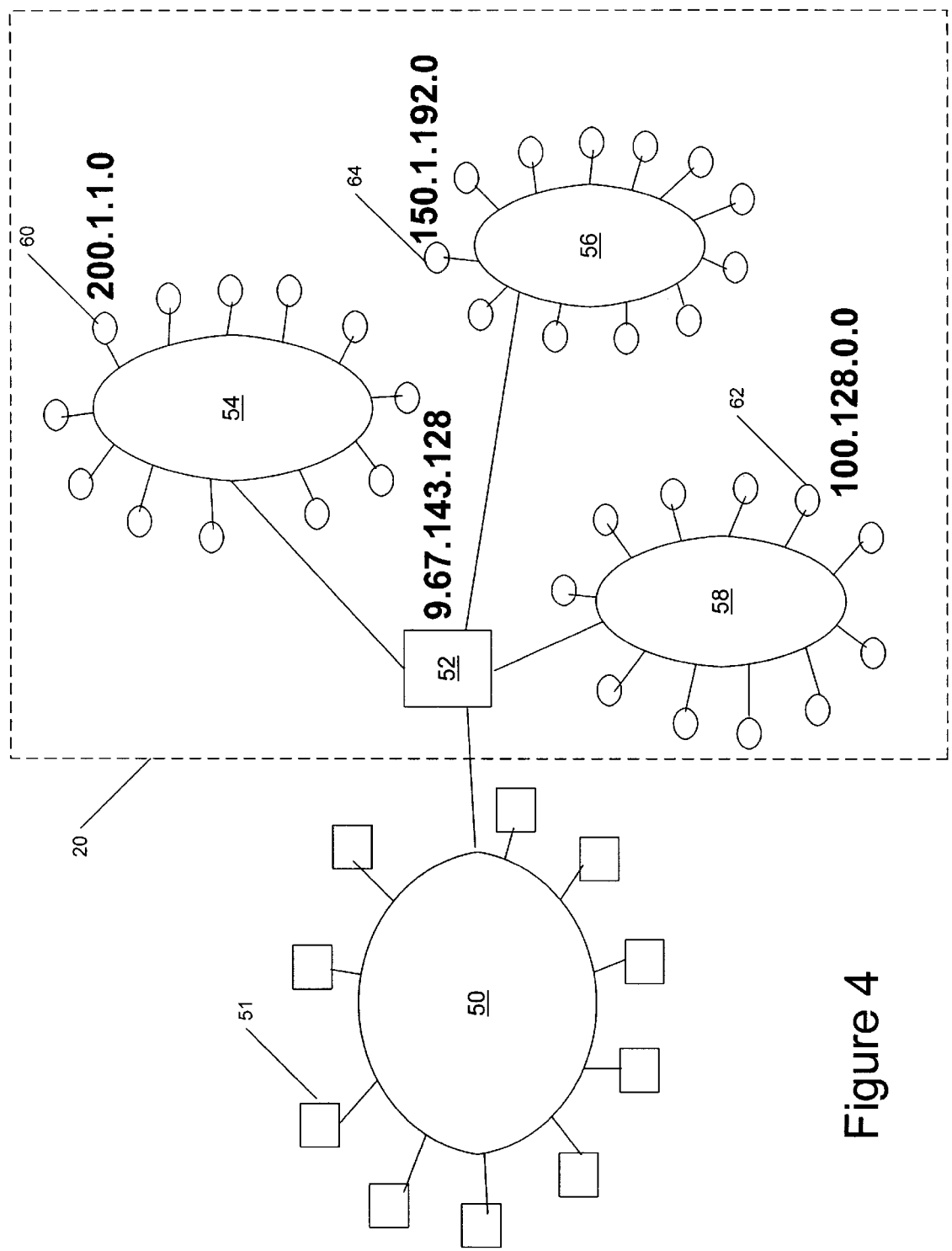
FIG. 4 is a block diagram of a simulated TCP/IP network according to the present invention.

FIG. 4 is a block diagram illustrating an example of a simulated network in a single processing system utilizing the present invention. As seen in FIG. 4, a network of physical devices 50 has associated with it a master station 51 which maintains a list of network and aliased addresses. Also connected to the network 50 is a processing system 20 which utilizes the present invention. Processing system 20 utilizes the present invention to, through a single network interface, provide a simulated router function 52, a simulated first subnet 54, a simulated second subnet 56 and a simulated third subnet 58.

As is illustrated in FIG. 4, TCP/IP applications which appear as TCP/IP workstations 60, 62 and 64 may be part of the subnets 54, 56 and 58. As is seen in FIG. 4 the simulated router 52 is assigned an IP address of 9.67.143.128 which is added to the routing list in the master station 51. Similarly, TCP/IP applications 60, 62 and 64 are assigned IP addresses of 200.1.1.0, 100.128.0.0 and 150.1.192.0, respectively. For router 52 and applications 60, 62, and 64 the assigned addresses may be aliased addresses within processing system 20 and are bound as described above. Each of these IP addresses is added to the routing list of master station 51. In operation, the subnets 54, 56, and 58 and router 52 are simulated by processing system 20 and appear as if multiple physical devices are present from the perspective of network 50. Thus, in a single processing system a simulated network may be established which then may be utilized as if a physical network were present.

While the invention has been described in the present example with respect to three subnets and a single router simulated by processing system 20, as will be appreciated by those of skill in the art, any number of configurations may be simulated in a single processing system through use of the present invention. Furthermore, while, in the present example, processing system 20 is connected to a network of physical device, such a connection is not required to simulate a network or application utilizing the present invention. Thus, processing system 20 may operate in a stand-alone-mode, for example, to test a TCP/IP application or to simulate an entire network or networks without requiring the physical devices of the network.

As will also be appreciated by those of skill in the art, the present invention may be utilized to simulate networks to, for example, provide a controllable and recreatable network. Furthermore, customer networks could be replicated at a remote site to diagnose problems or to analyze performance issues. Thus, the present invention may be useful in performance testing, firewall testing, software verification testing and network design among other uses.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method of providing a plurality of IP applications in a single processing system, the method comprising:

intercepting bind calls of a plurality of IP applications executing in a single processing system;

obtaining alternate addresses for utilization with each of the plurality of IP applications; and reinitiating the bind calls utilizing the alternate addresses so that the plurality of IP applications concurrently execute in the single processing system utilizing different alternate addresses for each of the plurality of IP applications; and wherein the alternate addresses are network addresses other than a default address associated with a network interface of the single processing system.

2. The method according to claim 1, further comprising the step of:

determining responsive to intercepting a bind call of one of the plurality of IP applications, if an alternate address is to be utilized with the one of the plurality of IP applications;

wherein said obtaining step comprises the step of obtaining an alternate address if said determining step determines that an alternate address is to be used; and wherein said reinitiating step comprises the step of reinitiating the bind call of the one of the plurality of IP applications utilizing the obtained alternate address if said determining step determines that an alternate address is to be utilized with the one of the plurality of IP applications.

3. The method according to claim 2 wherein said reinitiating step further comprises the step of reinitiating the bind call of the one of the plurality of IP applications utilizing an address of the intercepted bind call of the one of the plurality of IP applications if said determining step does not determine that an alternate is to be utilized.

4. The method according to claim 1 wherein said intercepting step comprise the step of:

exiting an IP stack of the processing system during a bind function; and wherein said obtaining step comprises the step of obtaining a TCP/IP aliased address to be bound to the application; and wherein said reinitiating step comprises the step of returning to the IP stack to bind the obtained TCP/IP aliased address to the application.

5. The method according to claim 1, wherein said obtaining step comprises the step of prompting a user to input the TCP/IP aliased address.

6. The method according to claim 1, wherein at least one of the IP applications comprises an SNMP network management application.

7. A processing system having a plurality of IP applications, the system comprising:

a processing system having a network interface;

means for intercepting bind calls of a plurality of IP applications executing in a single processing system;

means for obtaining alternate addresses for utilization with each of the plurality of IP applications; and means for reinitiating the bind calls utilizing the alternate addresses so that the plurality of IP applications concurrently execute in the single processing system utilizing different alternate addresses for each of the plurality of IP applications; and wherein the alternate addresses are network addresses other than a default address associated with the network interface of the single processing system.

8. The processing system according to claim 7, further comprising:

means, responsive to the means for intercepting, for determining if an alternate address is to be utilized with one of the plurality of IP applications corresponding to an intercepted bind call;

wherein said means for obtaining comprises means for obtaining an alternate address corresponding to the one of the plurality of IP applications if said means for determining determines that an alternate address is to be used; and wherein said means for reinitiating comprises means for reinitiating the bind call utilizing the alternate address corresponding to the one of the plurality of IP applications if said means for determining determines that an alternate address is to be utilized with the one of the plurality of IP applications.

9. The processing system according to claim 8 wherein said means for reinitiating further comprises means for reinitiating the bind call utilizing an address of the intercepted bind call of the one of the plurality of IP applications if said means for determining does not determine that an alternate is to be utilized.

10. The system according to claim 7 wherein said means for intercepting comprises means for exiting an IP stack of the processing system during a bind function; and wherein said means for obtaining comprises means for obtaining a TCP/IP aliased address to be bound to the application; and wherein said means for reinitiating comprises means for returning to the IP stack to bind the obtained TCP/IP aliased address to the application.

11. The system according to claim 7, wherein said means for obtaining comprises means for prompting a user to input an aliased address.

12. A computer program product for providing a plurality of IP applications in a single processing system, the computer program product comprising:

a computer-readable storage medium having computer-readable program code means embodied in said medium, said computer-readable program code means comprising:

computer-readable program code means for intercepting bind calls of a plurality of IP applications executing in a single processing system;

computer-readable code means for obtaining alternate addresses for utilization with each of the plurality of IP applications; and computer-readable code means for reinitiating the bind calls utilizing the alternate addresses that the plurality of IP applications concurrently execute in the single processing system utilizing different alternate addresses for each of the plurality of IP applications; and wherein the alternate addresses are network addresses other than a default address associated with a network interface of the single processing system.

13. The computer program product according to claim 12, further comprising:

computer-readable code means, responsive to the computer-readable code means for intercepting, for determining if an alternate address is to be utilized with one of the plurality of IP applications corresponding to an intercepted bind call;

wherein said computer-readable code means for obtaining comprises computer-readable code means for obtaining an alternate address corresponding to the one of the plurality of IP applications if said computer-readable code means for determining determines that an alternate address is to be used; and wherein said computer-readable code means for reinitiating comprises computer-readable code means for reinitiating the bind call utilizing the alternate address corresponding to the one of the plurality of IP applications if said computer-readable code means for determining determines that an alternate address is to be utilized with the one of the plurality of IP applications.

14. The processing system according to claim 13 wherein said computer-readable program code means for reinitiating further comprises computer-readable program code means for reinitiating the bind call utilizing an address of the intercepted bind call of the one of the plurality of IP applications if said computer-readable program code means for determining does not determine that an alternate is to be utilized.

15. The computer program product according to claim 12 wherein said computer-readable program code means for intercepting comprises:

computer-readable program code means for exiting an IP stack of the processing system during a bind function; and wherein said computer-readable program code means for obtaining comprises computer-readable program code means for obtaining a TCP/IP aliased address to be bound to the application; and wherein said computer-readable program code means for reinitiating comprises computer-readable program code means for returning to the IP stack to bind the obtained TCP/IP aliased address to the application.

16. The computer program product according to claim 12, wherein said computer-readable program code means for obtaining comprises computer-readable program code means for prompting a user to input an aliased address.

17. The computer program product according to claim 12, wherein at least one of the plurality of IP applications comprises an SNMP network management application.

* * * * *

UNITED STATES PATENT AND TRADEMARK OFFICE
CERTIFICATE OF CORRECTION

PATENT NO.   : 5,996,016
DATED        : November 30, 1999
INVENTOR(S)  : Dana R. Thalheimer, Alvah Dean Fuqua, Hwaan A. Lee It is certified that error appears in the above-identified patent and that said Letters Patent is hereby corrected as shown below:

In the Claims:

Claim 2,
Line 3 should read as follows:
--determining responsive to intercepting a bind call of one--

Signed and Sealed this

Third Day of July, 2001

*Attest:*

NICHOLAS P. GODICI
*Attesting Officer*   *Acting Director of the United States Patent and Trademark Office*